United States Patent
Tan et al.

(10) Patent No.: US 12,081,722 B2
(45) Date of Patent: Sep. 3, 2024

(54) STEREO IMAGE GENERATION METHOD AND ELECTRONIC APPARATUS USING THE SAME

(71) Applicant: Acer Incorporated, New Taipei (TW)

(72) Inventors: Chih-Haw Tan, New Taipei (TW); Wen-Cheng Hsu, New Taipei (TW); Chih-Wen Huang, New Taipei (TW); Shih-Hao Lin, New Taipei (TW); Sergio Cantero Clares, New Taipei (TW)

(73) Assignee: Acer Incorporated, New Taipei (TW)

( * ) Notice: Subject to any disclaimer, the term of this patent is extended or adjusted under 35 U.S.C. 154(b) by 208 days.

(21) Appl. No.: 17/583,139

(22) Filed: Jan. 24, 2022

(65) Prior Publication Data

US 2022/0286658 A1    Sep. 8, 2022

(30) Foreign Application Priority Data

Mar. 3, 2021 (TW) .................. 110107488

(51) Int. Cl.
*H04N 13/156* (2018.01)
*G06T 5/50* (2006.01)
(Continued)

(52) U.S. Cl.
CPC ............. *H04N 13/156* (2018.05); *G06T 5/50* (2013.01); *G06T 5/77* (2024.01); *G06T 7/50* (2017.01); *G06T 7/70* (2017.01); *G06V 40/18* (2022.01); *H04N 13/128* (2018.05); *H04N 13/302* (2018.05); *G06T 2207/10012* (2013.01); *G06T 2207/20221* (2013.01); *G06T 2207/30201* (2013.01); *H04N 2013/0081* (2013.01)

(58) Field of Classification Search
None
See application file for complete search history.

(56) References Cited

U.S. PATENT DOCUMENTS

2004/0066450 A1 * 4/2004 Lee ...................... H04N 13/161
                                                                 348/51
2004/0135780 A1    7/2004 Nims
(Continued)

FOREIGN PATENT DOCUMENTS

CN    102360489    2/2012
CN    106488213    3/2017
(Continued)

*Primary Examiner* — Xiaolan Xu
(74) *Attorney, Agent, or Firm* — JCIPRNET (57) ABSTRACT

A stereo image generation method and an electronic apparatus using the same are provided. The stereo image generation method includes the following steps. A two-dimensional (2D) original image corresponding to a first viewing angle is obtained, and a depth map of the 2D original image is estimated. Interpupillary distance information of a user is detected. A pixel shift processing is performed on the 2D original image according to the interpupillary distance information and the depth map to generate a reference image corresponding to a second viewing angle. An image inpainting processing is performed on the reference image to obtain a restored image. The restored image and the 2D original image are merged to generate a stereo image conforming to a stereo image format.

16 Claims, 5 Drawing Sheets

(51) Int. Cl.
*G06T 5/77* (2024.01)
*G06T 7/50* (2017.01)
*G06T 7/70* (2017.01)
*G06V 40/18* (2022.01)
*H04N 13/00* (2018.01)
*H04N 13/128* (2018.01)
*H04N 13/302* (2018.01)

(56) References Cited

U.S. PATENT DOCUMENTS

| | | | |
|---|---|---|---|
| 2008/0225113 A1* | 9/2008 | Saishu | H04N 13/317 |
| | | | 348/51 |
| 2013/0235155 A1* | 9/2013 | Feng | G06T 7/238 |
| | | | 348/43 |
| 2015/0130909 A1 | 5/2015 | Tang et al. | |
| 2017/0366795 A1 | 12/2017 | Chou et al. | |
| 2018/0241983 A1* | 8/2018 | Kimura | H04N 13/156 |

FOREIGN PATENT DOCUMENTS

| | | |
|---|---|---|
| CN | 109819231 | 5/2019 |
| CN | 110908499 | 3/2020 |
| WO | 2012117703 | 9/2012 |
| WO | 2013109252 | 7/2013 |

* cited by examiner

STEREO IMAGE GENERATION METHOD AND ELECTRONIC APPARATUS USING THE SAME

CROSS-REFERENCE TO RELATED APPLICATION

This application claims the priority benefit of Taiwan application serial no. 110107488, filed on Mar. 3, 2021. The entirety of the above-mentioned patent application is hereby incorporated by reference herein and made a part of this specification.

BACKGROUND

Technical Field

This disclosure relates to an electronic apparatus, and in particular to a stereo image generation method and an electronic apparatus using the same method.

Description of Related Art

With the advancement of display technology, displays that support three-dimensional (3D) image playback have gradually become popular. The difference between 3D display and two-dimensional (2D) display is that 3D display technology allows a viewer to experience a three-dimensional feel of the image, such as three-dimensional facial features of a character and a depth of field, while the traditional 2D images cannot present such an effect. The principle behind the 3D display technology is to allow a left eye of the viewer to watch a left-eye image and a right eye of the viewer to watch a right-eye image, so as to allow the viewer to experience the 3D visual effect. With the vigorous development of 3D stereoscopic display technology, it can provide people with a visually immersive experience. It is known that the 3D display needs to use the corresponding 3D display technology to play an image in a specific 3D image format, otherwise the display will not be able to display the image correctly. In addition, 3D image content that users can obtain by themselves is currently limited. Therefore, even if the user has a 3D display that is viewable by the naked eye, the user is still unable to fully and arbitrarily enjoy the display effect brought by the 3D display that is viewable by the naked eye.

SUMMARY

In view of this, this disclosure provides a stereo image generation method and an electronic apparatus using the same method, which can convert a two-dimensional (2D) image into a stereo image conforming to a stereo image format according to an actual interpupillary distance of a user.

The embodiment of the disclosure provides a stereo image generation method, which includes the following steps. A 2D original image corresponding to a first viewing angle is obtained, and a depth map of the 2D original image is estimated. Interpupillary distance information of a user is detected. A pixel shift processing is performed on the 2D original image according to the interpupillary distance information and the depth map to generate a reference image corresponding to a second viewing angle. An image inpainting processing is performed on the reference image to obtain a restored image. The restored image and the 2D original image are merged to generate a stereo image conforming to a stereo image format.

An embodiment of the disclosure provides an electronic apparatus, which includes an interpupillary distance tracking apparatus, a storage apparatus, and a processor. The processor is connected to the storage apparatus and is configured to execute the following steps. A 2D original image corresponding to a first viewing angle is obtained and a depth map of the 2D original image is estimated. Interpupillary distance information of a user is detected through the interpupillary distance tracking apparatus. A pixel shift processing is performed on the 2D original image according to the interpupillary distance information and the depth map to generate a reference image corresponding to a second viewing angle. An image inpainting processing is performed on the reference image to obtain a restored image. The restored image and the 2D original image are merged to generate a stereo image conforming to a stereo image format.

Based on the above, in the embodiment of the disclosure, the corresponding depth map may be generated according the 2D original image first, and then the stereo image conforming to the stereo image format may be generated according to the interpupillary distance of the user and the depth map. Accordingly, the embodiments of the disclosure can greatly expand the 3D content that can be displayed by the 3D display, and provide a more comfortable stereoscopic viewing experience.

To make the aforementioned more comprehensible, several embodiments accompanied with drawings are described in detail as follows.

DESCRIPTION OF THE EMBODIMENTS

Some embodiments of the disclosure accompanied with drawings are described in detail as follows. The reference numerals in the following description are regarded to represent the same or similar elements when the same reference numeral appears in the different drawings. These embodiments are only a part of the disclosure, and do not disclose all possible implementation manners of the disclosure. More precisely, these embodiments are just examples of the apparatuses and method of the disclosure that are within the scope of the patent application.

Figure 1:
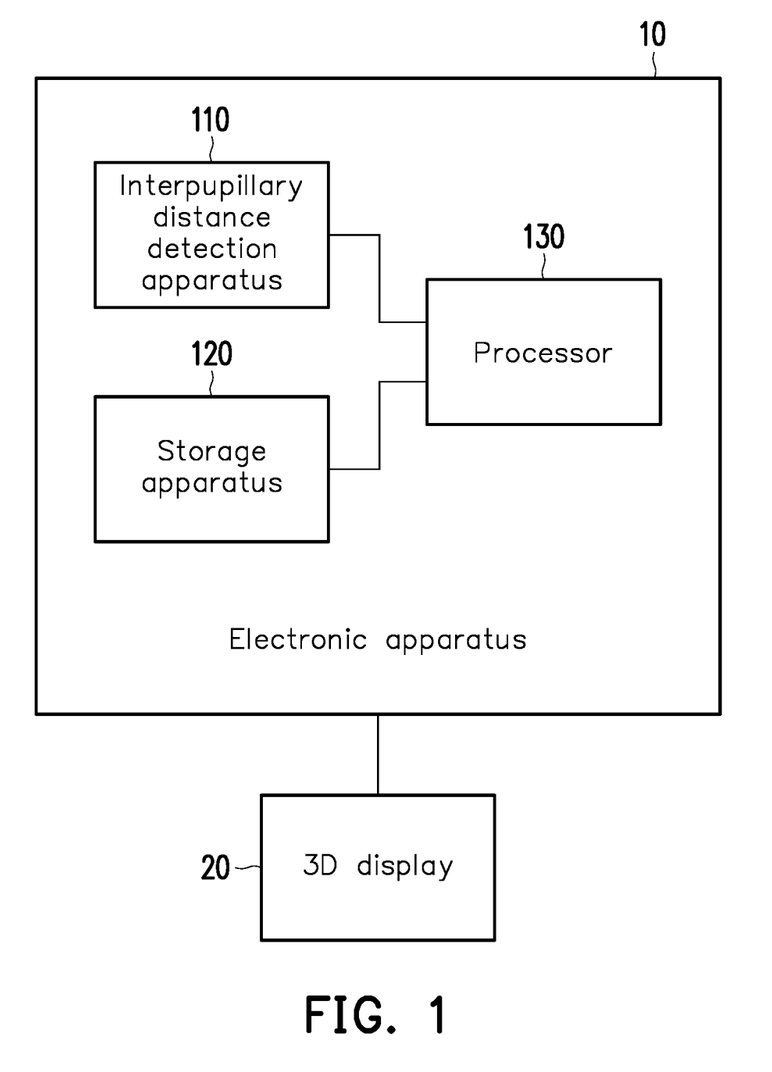
FIG. 1 is a schematic diagram of an electronic apparatus according to an embodiment of the disclosure.

FIG. 1 is a schematic diagram of an electronic apparatus according to an embodiment of the disclosure. With reference to FIG. 1, an electronic apparatus 10 may include an interpupillary distance detection apparatus 110, a storage apparatus 120, and a processor 130. The processor 130 is coupled to the storage apparatus 120. In an embodiment, the electronic apparatus 10 and a stereoscopic (three-dimensional, 3D) display 20 may form a 3D display system. The 3D display 20 may be a 3D display that is viewable by a naked eye or a 3D display that is viewable only when specific glasses are worn. On the other hand, the 3D display may be a head-mounted display apparatus or a computer screen, a desktop screen, or a TV that provides a 3D image display function. The 3D display system may be a single integrated system or a separated system. Specifically, the 3D display 20, the interpupillary distance detection apparatus 110, the storage apparatus 120, and the processor 130 in the 3D display system may be implemented as an all-in-one (AIO) electronic apparatus, such as a head-mounted display apparatus, a notebook computer, a smart phone, a tablet, or a game console. Alternatively, the 3D display 20 may be connected to the processor 130 of the computer system through a wired transmission interface or a wireless transmission interface, such as a head-mounted display apparatus, a desktop screen, or an electronic signage that is connected to the computer system.

The interpupillary distance detection apparatus 110 may be configured to detect interpupillary distance (IPD) information of a user, for example a related apparatus that may obtain eyeball information such as an eye tracking apparatus, an eye tracker, or an image capturing apparatus. In some embodiments, an apparatus with computing capabilities (such as the processor 130) may receive a user image taken by the image capturing apparatus, and may calculate interpupillary distance information of the user by executing image processing such as face recognition and eye recognition. Alternatively, in some embodiments, the eye tracking apparatus may obtain a position of the pupil through emission of an infrared beam, and calculate the interpupillary distance information.

The storage apparatus 120 is configured to store data, such as an image, data, and a program code (such as an operating system, an application, or a driver) for the processor 130 to access. The storage apparatus 120 may be, for example, any type of fixed or removable random access memory (RAM), a read-only memory (ROM), a flash memory, a hard disk, or a combination thereof.

The processor 130 is coupled to the interpupillary distance detection apparatus 110 and the storage apparatus 120, and is for example, a central processing unit (CPU), an application processor (AP), or other programmable general-purpose or special-purpose microprocessor, digital signal processor (DSP), image signal processor (ISP), graphics processor (GPU), or other similar apparatus, an integrated circuit, and a combination thereof. The processor 130 may access and execute the program code and software modules recorded in the storage apparatus 120, so as to implement the stereo image generation method according to the embodiment of the disclosure.

In order to allow the user to experience the 3D visual effect through the 3D display 20, the 3D display 20 may be based on a variety of designs to allow left and right eyes of the user to view an image content (that is, a left-eye image and a right-eye image) corresponding to different viewing angles. In the embodiment of the disclosure, the electronic apparatus 10 may generate a stereo image conforming to a stereo image format according to a two-dimensional (2D) plane image corresponding to a single viewing angle, and the stereo image may include the image content corresponding to the different viewing angles. Accordingly, the 3D display 20 may display the stereo image conforming to the stereo image format based on a 3D display technology of the 3D display 20, so as to allow the user to watch the stereo image content.

Figure 2:
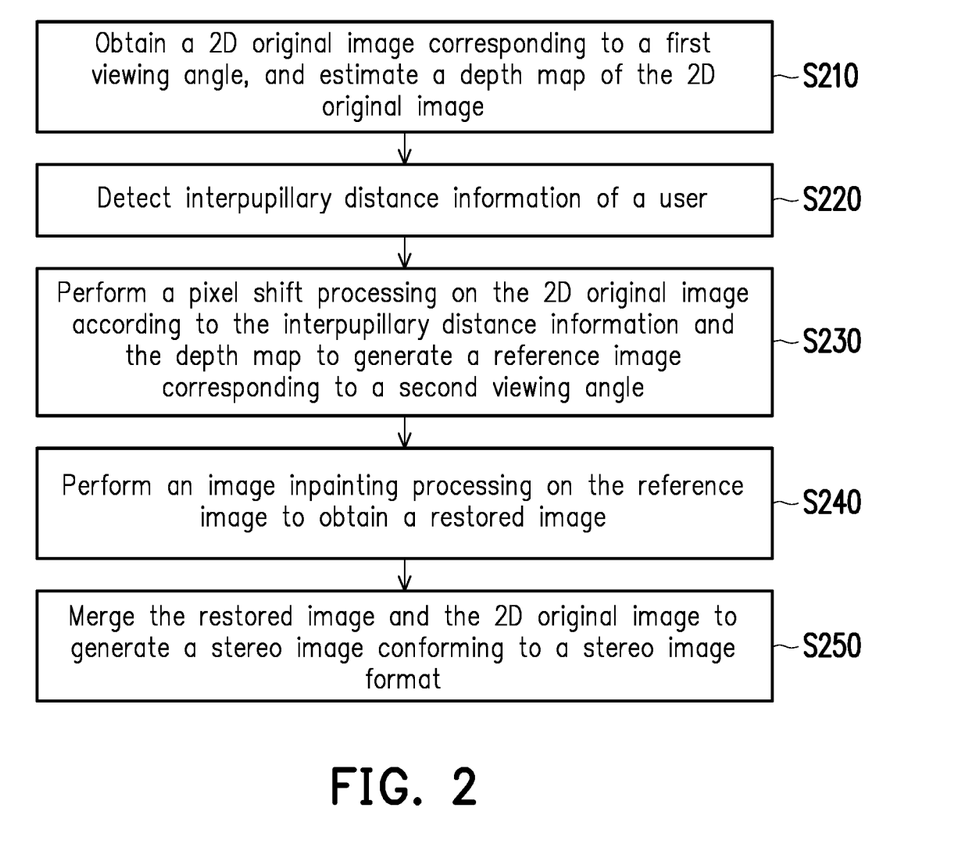
FIG. 2 is a flowchart of a stereo image generation method according to an embodiment of the disclosure.

FIG. 2 is a flowchart of a stereo image generation method according to an embodiment of the disclosure. With reference to FIG. 2, the method of this embodiment is applicable to the electronic apparatus 10 in the above-mentioned embodiment. The detailed steps of this embodiment are described below in conjunction with various components in the electronic apparatus 10.

In Step S210, the processor 130 obtains a 2D original image corresponding to a first viewing angle, and estimates a depth map of the 2D original image. The 2D original image may be a photo taken by a general camera apparatus according to a single viewing angle. The 2D original image may also be image content generated by a drawing software. On the other hand, the 2D original image may also be image content provided by a certain application operating in a full-screen mode. Or, the 2D original image may also be image content displayed on a display by an application. Alternatively, the 2D original image may also be a single frame image in an image stream. The processor 130 may use a screen capture technique such as "Desktop Duplication API" of the Windows operating system to obtain the 2D original image. Or, the processor 130 may obtain the 2D original image through any image transmission technology. It should be noted that the 2D original image is image data suitable for display using a two-dimensional (2D) display technology.

In some embodiments, the processor 130 may use various monocular depth estimation techniques to estimate the depth map of the 2D original image. The monocular depth estimation technique may use a DenseNet model, a SeNet model, or a MiDaS model in a convolutional neural network architecture, or a MegaDepth model or a CycleGAN model in a generative adversarial network architecture to estimate depth information of the 2D original image. In other words, the processor 130 may input the 2D original image into a trained deep learning model, and enables the deep learning model to generate the depth map of the 2D original image accordingly. Model parameters (such as number of neural network layers and weight of each neural network layer) of the trained deep learning model have been decided in prior training and stored in the storage apparatus 120. Alternatively, in some embodiments, the processor 130 may use a technique such as Structure from Motion (SFM) to estimate the depth map of the 2D original image.

In Step S220, the processor 130 detects interpupillary distance information of the user through the interpupillary distance detection apparatus 110. The interpupillary distance information varies from person to person, but it is mainly related to race, gender, and age. In other words, different users will have different interpupillary distances. In general, the 3D display system performs stereoscopic display according to the interpupillary distance information of the user. For example, the processor 130 controls a hardware configuration of the 3D display 20 or executes a corresponding image processing according to the interpupillary distance information of the user, thereby performing stereoscopic display.

In Step S230, the processor 130 performs a pixel shift processing on the 2D original image according to the interpupillary distance information and the depth map to generate a reference image corresponding to a second viewing angle. The depth map generated based on the 2D original image includes multiple depth values. The multiple depth values correspond one-to-one to multiple pixels in the 2D original image. In order to generate image data corresponding to the second viewing angle, the processor 130 may refer to the depth map and the interpupillary distance information of the user to create the reference image corresponding to the second viewing angle, and the first viewing angle is different from the second viewing angle. More specifically, the processor 130 may decide a pixel shift amount (that is, aberration information) corresponding to each of the pixels in the 2D original image according to the interpupillary distance information and each of the depth values in the depth map, and extract image data of the 2D original image accordingly, so as to create the reference image corresponding to the second viewing angle. It is known that the deeper the depth, the smaller the pixel shift amount, and the shallower the depth, the greater the pixel shift amount.

In Step S240, the processor 130 performs an image inpainting processing on the reference image to obtain a restored image. In detail, since the reference image includes the image content corresponding to the new second viewing angle, some scene information that was originally occluded in the 2D original image may be revealed in the reference image, and this scene information is not obtainable from the 2D original image corresponding to the first viewing angle. In addition, image edge of the reference image corresponding to the second viewing angle also includes scene information that does not originally exist in the 2D original image corresponding to the first viewing angle. Therefore, the reference image created based on the depth map and the 2D original image includes missing blocks of the image. In some embodiments, the processor 130 may perform the image inpainting processing to fill in the missing blocks (or known as holes) of the image in the reference image. In some embodiments, the processor 130 may use pixel information around the missing blocks of the image to fill in the missing blocks of the image in the reference image. Alternatively, in some embodiments, the processor 130 may use a convolutional neural network model to perform the image inpainting. For example, the processor 130 may perform the image inpainting process on the reference image through a constant color filling, a horizontal extrapolation using depth information, a variable inpainting using depth information, or other related calculations.

In Step S250, the processor 130 merges the restored image and the 2D original image to generate a stereo image conforming to a stereo image format. It is known that the stereo image includes the 2D original image corresponding to the first viewing angle and the restored image corresponding to the second viewing angle. In other words, the 2D original image and the restored image may be respectively a left-eye image and a right-eye image. The stereo image format includes a side-by-side (SBS) format or a top-and-bottom (TB) format. Based on the foregoing, the restored image corresponding to the second viewing angle is generated according to the interpupillary distance information detected by the interpupillary distance detection apparatus 110, therefore, the electronic apparatus 10 according to the embodiment of the disclosure may generate different stereo images according to interpupillary distance information of different users. In other words, the electronic apparatus 10 according to the embodiment of the disclosure may generate a stereo image that conforms to the actual interpupillary distance of the user according to the 2D original image, thereby enhancing viewing experience of the stereo image.

In addition, it should be noted that in some embodiments, the processor 130 has to perform other image processing on the stereo image conforming to the stereo image format according to the interpupillary distance information of the user, so as to generate image data suitable for playback on the 3D display 20. For example, the 3D display 20 provides two parallax images to the left eye and the right eye through lens refraction principle or a grating technology when it is a 3D display that is viewable by the naked eye, it, so as to allow a viewer to experience a stereoscopic display effect. Therefore, the processor 130 performs an image weaving processing on the stereo image to stagger pixel data of the left-eye image and pixel data of the right-eye image, so as to generate a single-frame image suitable for playback on the 3D display that is viewable by the naked eye. In order to accurately provide the left-eye image and the right-eye image respectively to the left eye and the right eye, the processor 130 has to perform the image weaving processing according to the interpupillary distance information of the user, so as to decide how to stagger the pixel data of the left-eye image and the pixel data of the right-eye image. Accordingly, since the stereo image generated by the embodiment of the disclosure is generated according to the actual interpupillary distance information of the user, and the processor 130 performs the image weaving processing according to the same interpupillary distance information, viewing comfort of the stereo image content can be improved and the user is allowed to experience 3D visual effects with good stereoscopic effects.

Figure 3:
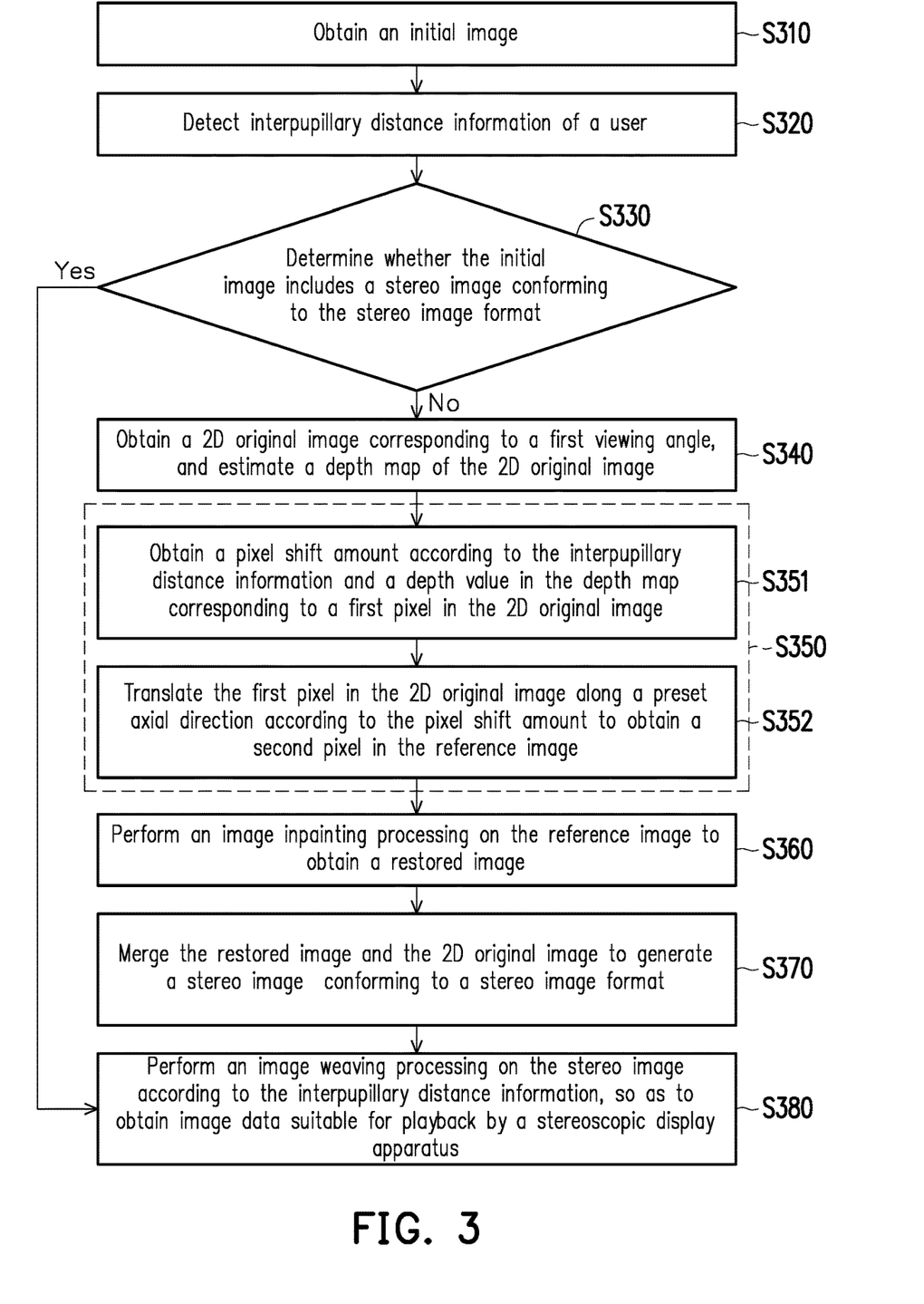
FIG. 3 is a flowchart of a stereo image generation method according to an embodiment of the disclosure.
Figure 4:
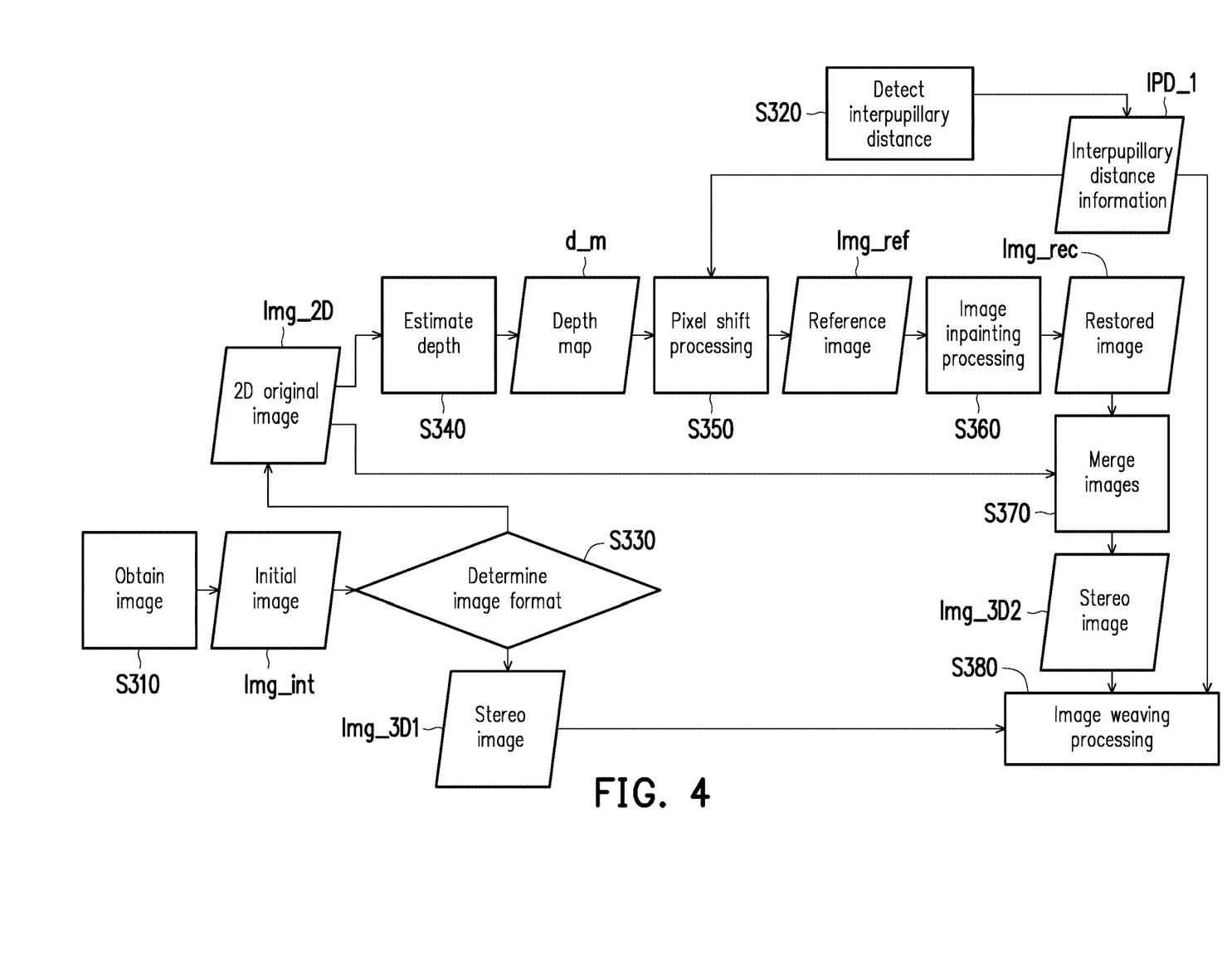
FIG. 4 is a schematic diagram of a stereo image generation method according to an embodiment of the disclosure.

FIG. 3 is a flowchart of a stereo image generation method according to an embodiment of the disclosure. FIG. 4 is a schematic diagram of a stereo image generation method according to an embodiment of the disclosure. With reference to FIGS. 3 and 4, a manner of this embodiment is applicable to the electronic apparatus 10 in the above-mentioned embodiment, and the detailed steps of this embodiment are described below in conjunction with the various components in the electronic apparatus 10.

In Step S310, the processor 130 obtains an initial image Img_int. For example, the processor 130 may capture a desktop image of the electronic apparatus 10 to obtain the initial image Img_int. In Step S320, the processor 130 detects the interpupillary distance information IPD_1 of the user through the interpupillary distance detection apparatus 110. In Step S330, the processor 130 determines whether the initial image Img_int includes a stereo image Img_3D1 conforming to the stereo image format. In some embodiments, the stereo image Img_3D1 conforming to the stereo image format is the initial image Img_int. In some embodiments, the stereo image Img_3D1 conforming to the stereo image format is some image blocks in the initial image Img_int.

When the Step S330 is determined to be affirmative, then Step S380 is executed, in which the processor 130 performs the image weaving processing on the stereo image Img_3D1 according to the interpupillary distance information IPD_1, so as to obtain image data suitable for playback by the 3D display apparatus 20. As per the foregoing, the processor 130 staggers the pixel data of the left-eye image and the pixel data of the right-eye image in the stereo image Img_3D1, so as to generate the image data that can be played by the 3D display apparatus 20.

When the Step S330 is determined to be negative, in Step S340, the processor 130 obtains a 2D original image Img_2D corresponding to the first viewing angle, and estimates a depth map d_m of the 2D original image Img_2D. The processor 130 may directly use the initial image Img_int as the 2D original image Img_2D, or extract some image blocks from the initial image Img_int to obtain the 2D original image Img_2D. The depth map d_m includes depth values respectively corresponding to each pixel in the 2D original image Img_2D, and the depth values may be within a preset initial range, such as 0 to 255.

In Step S350, the processor 130 performs the pixel shift processing on the 2D original image Img_2D according to the interpupillary distance information IPD_1 and the depth map d_m to generate a reference image Img_ref corresponding to the second viewing angle. The Step S350 may include sub-Steps S351 to S352.

In Step S351, the processor 130 obtains a pixel shift amount according to the interpupillary distance information IPD_1 and a depth value in the depth map d_m corresponding to a first pixel in the 2D original image Img_2D. Specifically, the processor 130 may respectively decide the pixel shift amount of each of the first pixels in the 2D original image Img_2D according to the interpupillary distance information IPD_1 and each of the depth values in the depth map d_m.

In some embodiments, the processor 130 may normalize each of the depth values in the depth map d_m to be within a preset numerical range, such as 0 to 1, so as to generate depth information suitable for calculating the pixel shift amount. That is, the processor 130 may normalize the depth value within the preset initial range to be within the preset numerical range.

In some embodiments, the pixel shift amount may be a multiplication result of the interpupillary distance information IPD_1 and the depth value in the depth map d_m. That is, the processor 130 may respectively multiply each of the depth values in the depth map d_m by the interpupillary distance information IPD_1 of the user to obtain the pixel shift amount of each of the first pixels in the 2D original image Img_2D. In some embodiments, the processor 130 may decide the pixel shift amount according to integer processing such as rounding, unconditional rounding down, or unconditional rounding up, when each of the depth values in the depth map d_m is normalized to be between 0 and 1.

In some embodiments, the pixel shift amount may be a multiplication result of the interpupillary distance information IPD_1 and a function output value related to the depth value in the depth map d_m. In other words, the processor 130 may first input a certain depth value into a function to generate the function output value related to the depth value, and then multiply the function output value by the interpupillary distance information IPD_1 to decide the corresponding pixel shift amount. This function may be, for example, a linear function. That is, the pixel shift amount may be generated through formula (1).

$$\text{Pixel shift amount} = \text{Interpupillary distance} \times f(d) \qquad \text{Formula (1)}$$

where, f(•) is a function that takes a depth value d as an input value. Similarly, the processor 130 may decide the pixel shift amount according to the integer processing such as rounding, unconditional rounding down, or unconditional rounding up, when the pixel shift amount generated by the formula (1) is not an integer.

In Step S352, the processor 130 translates the first pixel in the 2D original image Img_2D along a preset axial direction according to the pixel shift amount to obtain a second pixel in the reference image Img_ref. The preset axial direction may include a positive X-axis direction or a negative X-axis direction. That is, the processor 130 may translate the first pixel in the 2D original image Img_2D to the right according to the pixel shift amount to obtain the second pixel in the reference image Img_ref. In this case, the 2D original image Img_2D is used as the right-eye image to create the left-eye image. Alternatively, the processor 130 may translate the first pixel in the 2D original image Img_2D to the left according to the pixel shift amount to obtain the second pixel in the reference image Img_ref. In this case, the 2D original image Img_2D is used as the left-eye image to create the right-eye image.

In some embodiments, the processor 130 may determine whether pixel coordinates of the second pixel fall within the reference image Img_ref after translating the first pixel in the 2D original image Img_2D to obtain the second pixel. The processor 130 may discard the second pixel in response to the pixel coordinates of the second pixel not falling within the reference image Img_ref. For example, assuming that pixel coordinates of the first pixel is (0,0) and the pixel shift amount is Δs, the second pixel with the pixel coordinates (−Δs,0) is obtained when the processor 130 translates the first pixel along the negative X-axis. Based on this, the processor 130 may determine that the second pixel does not fall within the reference image Img_ref accordingly and discard the second pixel with the pixel coordinates (−Δs,0).

In some embodiments, the processor 130 may translate the first pixel in the 2D original image Img_2D along the preset axial direction according to the pixel shift amount. The processor 130 may also translate another first pixel in the 2D original image Img_2D along the preset axial direction according to another pixel shift amount. The processor 130 may choose to set the first pixel as the second pixel in the reference image Img_ref in response to both the first pixel and the another pixel corresponding to the pixel coordinates of the second pixel. In other words, if the multiple first pixels are translated according to the corresponding pixel shift amounts and all correspond to the same pixel coordinates, the processor 130 may select one of these first pixels to serve as the second pixel in the reference image Img_ref. In some embodiments, the processor 130 may decide on the second pixel in the reference image Img_ref according to the depth value corresponding to each of the first pixels. Alternatively, in some embodiments, the processor 130 may decide on the second pixel in the reference image Img_ref according to a sequence of the calculation corresponding to each of first pixels.

Figure 5:
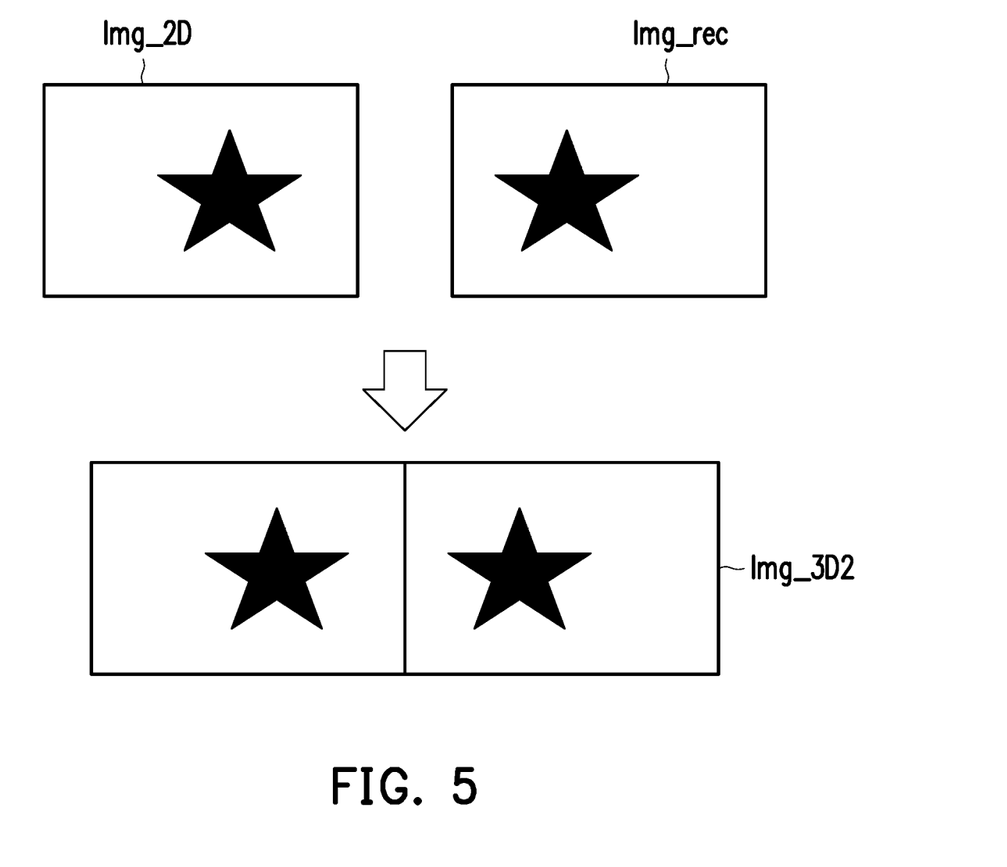
FIG. 5 is a schematic diagram of an example of generating a stereo image conforming to the stereo image format according to an embodiment of the disclosure.

In Step S360, the processor 130 performs the image inpainting processing on the reference image Img_ref to obtain a restored image Img_rec. In Step S370, the processor 130 merges the restored image Img_rec and the 2D original image Img_2D to generate a stereo image Img_3D2 conforming to the stereo image format. FIG. 5 is a schematic diagram of an example of generating the stereo image Img_3D2 conforming to the stereo image format according to an embodiment of the disclosure. With reference to FIG. 5, the processor 130 may place the restored image Img_rec and the 2D original image Img_2D side-by-side to obtain the stereo image Img_3D2 conforming to the SBS format. In some embodiments, the processor 130 may also perform an image scaling processing on the restored image Img_rec and the 2D original image Img_2D before merging the two scaled images. After that, in Step S380, the processor 130 performs an image weaving processing on the stereo image Img_3D2 according to the interpupillary distance information IPD_1, so as to obtain image data suitable for playback by the stereoscopic display apparatus 20.

It should be noted that, in the embodiment of the disclosure, the pixel shift amount is generated based on the actual interpupillary distance information of the user, therefore, the aberration information between the reference image and the 2D original image created based on these pixel shift amounts may conform to an actual distance between the eyes of the user. Therefore, the viewing comfort can be improved and good stereoscopic effects can be experienced when the 3D display system performs other hardware configuration or other subsequent image processing required for 3D display according to the actual interpupillary distance information, as the stereo image conforming to the stereo image format is also generated based on the actual interpupillary distance information.

In summary, in the embodiment of the disclosure, the user may convert the two-dimensional plane image into the stereo image conforming to the stereo image format, so as to enrich the 3D content that can be displayed on the 3D display. In addition, since the stereo image is generated based on the actual interpupillary distance information of the user, the interpupillary distance information used in the image weaving processing of the technology of the 3D display that is viewable by the naked eye is consistent with the interpupillary distance information used to generate the stereo image. Accordingly, the viewing comfort can be greatly improved and the user can experience good stereoscopic effects.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A stereo image generation method, suitable for an electronic apparatus, the method comprising:
   obtaining a two-dimensional (2D) original image corresponding to a first viewing angle, and estimating a depth map of the 2D original image;
   detecting interpupillary distance information of a user in real-time through an interpupillary distance detection apparatus;
   performing a pixel shift processing on the 2D original image according to the interpupillary distance information of the user and the depth map to generate a reference image corresponding to a second viewing angle;
   performing an image inpainting process on the reference image to obtain a restored image;
   merging the restored image and the 2D original image to generate a stereo image conforming to a stereo image format, wherein the stereo image comprising a left-eye image and a right-eye image is generated based on the interpupillary distance information detected in real-time;
   performing an image weaving processing on the stereo image to stagger pixel data of the left-eye image and pixel data of the right-eye image according to the interpupillary distance information detected in real-time, so as to obtain image data suitable for playback by a stereo display apparatus, wherein the interpupillary distance information detected in real-time for performing the image weaving processing is consistent with the interpupillary distance information detected in real-time for generating the stereo image; and
   displaying the image data by the stereoscopic display apparatus for the user with the detected interpupillary distance information.

2. The stereo image generation method according to claim 1, wherein the stereo image format comprises a side-by-side format or a top-and-bottom format.

3. The stereo image generation method according to claim 1, wherein performing the pixel shift processing on the 2D original image according to the interpupillary distance information and the depth map to generate the reference image corresponding to the second viewing angle comprises:
   obtaining a pixel shift amount corresponding to a first pixel in the 2D original image according to the interpupillary distance information and a depth value in the depth map; and
   obtaining a second pixel in the reference image by translating the first pixel in the 2D original image along a preset axial direction according to the pixel shift amount.

4. The stereo image generation method according to claim 3, wherein the pixel shift amount is a multiplication result of the interpupillary distance information and the depth value in the depth map.

5. The stereo image generation method according to claim 3, wherein the pixel shift amount is a multiplication result of the interpupillary distance information and a function output value related to the depth value in the depth map.

6. The stereo image generation method according to claim 4, wherein generating the reference image by performing the pixel shift processing according to the interpupillary distance information and the depth map further comprises:
   normalizing each depth value in the depth map to be within a preset numerical range.

7. The stereo image generation method according to claim 3, wherein translating the first pixel in the 2D original image along the preset axial direction according to the pixel shift amount to obtain the second pixel in the reference image comprises:
   determining whether pixel coordinates of the second pixel fall within the reference image; and
   discarding the second pixel in response to the pixel coordinates of the second pixel not falling within the reference image.

8. The stereo image generation method according to claim 3, wherein translating the first pixel in the 2D original image along the preset axial direction according to the pixel shift amount to obtain the second pixel in the reference image comprises:
   translating the first pixel in the 2D original image along the preset axial direction according to the pixel shift amount;
   translating another first pixel in the 2D original image along the preset axial direction according to another pixel shift amount; and
   selecting the first pixel to be set as the second pixel in the reference image in response to the first pixel and the another first pixel both corresponding to the pixel coordinates of the second pixel.

9. An electronic apparatus, comprising:
   an interpupillary distance detection apparatus;
   a storage apparatus, with a plurality of modules recorded; and
   a processor, connected to the interpupillary distance detection apparatus and the storage apparatus, and is configured to:
     obtain a 2D original image corresponding to a first viewing angle, and estimate a depth map of the 2D original image;
     detect interpupillary distance information of a user in real-time through the interpupillary distance detection apparatus;
     perform a pixel shift processing on the 2D original image according to the interpupillary distance information of the user and the depth map to generate a reference image corresponding to a second viewing angle;

perform an image inpainting process on the reference image to obtain a restored image;

merge the restored image and the 2D original image to generate a stereo image conforming to a stereo image format, wherein the stereo image comprising a left-eye image and a right-eye image is generated based on the interpupillary distance information detected in real-time;

perform an image weaving processing on the stereo image to stagger pixel data of the left-eye image and pixel data of the right-eye image according to the interpupillary distance information detected in real-time, so as to obtain image data suitable for playback by a stereoscopic display apparatus, wherein the interpupillary distance information detected in real-time for performing the image weaving processing is consistent with the interpupillary distance information detected in real-time for generating the stereo image; and display the image data by the stereoscopic display apparatus for the user with the detected interpupillary distance information.

10. The electronic apparatus according to claim 9, wherein the stereo image format comprises a side-by-side format or a top-and-bottom format.

11. The electronic apparatus according to claim 9, wherein the processor is further configured to:

obtain a pixel shift amount corresponding to a first pixel in the 2D original image according to the interpupillary distance information and a depth value in the depth map; and obtain a second pixel in the reference image by translating the first pixel in the 2D original image along a preset axial direction according to the pixel shift amount.

12. The electronic apparatus according to claim 11, wherein the pixel shift amount is a multiplication result of the interpupillary distance information and the depth value in the depth map.

13. The electronic apparatus according to claim 11, wherein the pixel shift amount is a multiplication result of the interpupillary distance information and a function output value related to the depth value in the depth map.

14. The electronic apparatus according to claim 12, wherein the processor is further configured to:

normalize each depth value in the depth map to be within a preset numerical range.

15. The electronic apparatus according to claim 11, wherein the processor is further configured to:

determine whether pixel coordinates of the second pixel fall within the reference image; and discard the second pixel in response to the pixel coordinates of the second pixel not falling within the reference image.

16. The electronic apparatus according to claim 11, wherein the processor is further configured to:

translate the first pixel in the 2D original image along the preset axial direction according to the pixel shift amount;

translate another first pixel in the 2D original image along the preset axial direction according to another pixel shift amount; and select the first pixel to be set as the second pixel in the reference image in response to the first pixel and the another first pixel both corresponding to the pixel coordinates of the second pixel.

* * * * *